Patented Apr. 16, 1940

2,197,046

UNITED STATES PATENT OFFICE 2,197,046

MALEIC ANHYDRIDE-ROSIN ESTER PRODUCTS AND METHOD OF PRODUCING

Irvin W. Humphrey and Joseph N. Borglin, Wilmington, Del., assignors to Hercules Powder Company, Wilmington, Del., a corporation of Delaware No Drawing. Application July 8, 1937,
Serial No. 152,666

8 Claims. (Cl. 260—101)

This invention relates to a new composition of matter and method for its production, more particularly, the composition in accordance with this invention involves a heterocyclic alcohol ester of an unsaturated resin acid as abietic, pimaric, pyroabietic etc., the unsaturation of the alcohol radical or of the resin acid radical, or of both having been reduced by hydrogenation.

In preparing the composition by the method in accordance with this invention, the monohydric heterocyclic alcohol or the resin acid, or both may be hydrogenated and then reacted in the presence of heat to form a hydrogenated ester, or the alcohol and resin acid may be reacted in the presence of heat and the resultant ester then subjected to hydrogenation.

The monohydric heterocyclic alcohol for use in preparing the composition in accordance with this invention may, for example, be furfuryl alcohol, methoxyfurfuryl alcohol, ethyl furfuryl alcohol, thienyl carbinol, ($C_4H_3S.CH_2OH$) tetrahydrofurfuryl alcohol etc. and the resin acid may be in the form, for example, of commercial abietic acid, wood or gum rosin or hydrogenated rosin, etc. As equivalents for the alcohols indicated, an inorganic ester of the alcohols, as, for example, furfuryl chloride, tetrahydrofurfuryl chloride, etc. may be used and equivalently where an ester is used in place of an alcohol, salts of abietic acid as, for example, sodium abietate, potassium abietate, etc. may be used, preferably in alcoholic solution, in place of abietic acid or rosin.

In carrying out the method in accordance with this invention the alcohol, previously hydrogenated or not, and the resin acid, previously hydrogenated or not, will, as has been indicated, be reacted in the presence of heat and desirably also in the presence of an acid catalyst as, for example, p-toluene sulfonic acid, hydrogen chloride, boric acid, etc. Where an acid catalyst is used, however, such will be used in small quantity, say in amount of about 0.01% to 5.0% in order to avoid excessive polymerization of the alcohol. Further, if desired, a hydrocarbon as, for example, toluene, xylene, mineral spirits, or the like, may be used to assist in removing water of reaction.

In carrying out the method where both the alcohol and the abietic acid have been subjected to hydrogenation, the hydrogenated alcohol and hydrogenated abietic acid are reacted as indicated. On the other hand, where neither the alcohol nor the abietic acid has been subjected to hydrogenation, the product of the reaction is subjected to hydrogenation under pressure and in the presence of a suitable hydrogenation catalyst. Again, either the alcohol or the abietic acid may be subjected to hydrogenation prior to reacting for the formation of the composition and the product of the reaction may or may not be subject to hydrogenation with respect to the alcohol or abietyl radicals or both as the case may be.

In carrying out the method in accordance with this invention the alcohol and abietic acid may be treated in any desired quantities preferably with the alcohol in excess of that required for combination with the resin acid. The reaction may be carried out at any suitable temperature, say for example, within about the range of 100–300° C., with or without superatmospheric pressure depending upon the temperature. The time required will be dependent substantially upon the temperature and whether or not a catalyst is used. As has been indicated, an inorganic ester of a monohydric heterocyclic alcohol and a salt of abietic acid may be used equivalently for the alcohol and abietic acid and when such are used they will be desirably used in alcoholic solution as in solutions of ethyl, butyl, methyl, etc. alcohol and the reaction will be carried out under pressure depending upon the temperature used in order to avoid loss of the alcohol.

As illustrative of procedure in accordance with the method of this invention, for the production, for example, of tetrahydrofurfuryl abietate, for example, 200 grams of rosin, 200 grams of tetrahydrofurfuryl alcohol, obtained by hydrogenation of furfuryl alcohol and 50 cc. of toluene are refluxed for about forty hours at about 200° C. Alternatively 1000 grams of rosin and 1000 grams of tetrahydrofurfuryl alcohol, 25 grams of p-toluene sulphonic acid and 50 cc. of toluene are treated at about 160° C. for about 16 hours.

The reaction may be speeded up in either case by autoclaving at say about 200–250° C. or by proceeding continuously as by passing the reagents through a reaction chamber at a relatively high temperature.

The crude product, tetrahydrofurfuryl abietate may be purified by washing with an alkaline solution, if necessary, for example, a sodium carbonate solution, to remove excess abietic acid if present, distilling to remove volatiles and fractionation in vacuo to remove any polymerized ester if desired, though it will be understood that the polymerized ester will be as advantageous and equivalent of the unpolymerized ester for certain uses. The ester may be refined by dissolving in a suitable solvent, such as gasoline, mineral spirits, etc. and agitating with a substantially immiscible color body solvent as phenol, resorcinol, aniline, etc.

The ester, tetrahydrofurfuryl abietate, for example, may be formed by reacting 100 grams of tetrahydrofurfuryl chloride and 300 grams sodium resinate in solution in 1000 g. ethyl, or butyl, etc. alcohol by heating at about 125° C. under a pressure of about 110 pounds per square inch, for about one hour.

Tetrahydrofurfuryl abietate may constitute the product in accordance with this invention or if desired the abietyl radical may be hydrogenated for the production of tetrahydrofurfuryl dihydroabietate. Thus, for example, the tetrahydrofurfuryl abietate may be subjected to hydrogenation by heating at a temperature of say about 125°-200° C. under a hydrogen pressure of say about 100-3000 pounds per square inch and if desired in the presence of a base metal hydrogenation catalyst as, for example, a nickel, cobalt, copper-nickel, a metallic chromite as zinc, copper, nickel chromite, etc., hydrogenation catalyst or their mixtures, either unsupported or supported on kieselguhr, silica gel, filter cel, etc. Hydrogenation catalysts as palladium and platinum may also be employed. As illustrated, for example, 1000 parts by weight of tetrahydrofurfuryl abietate are heated at a temperature of say 160° C. with 20 parts by weight of an active nickel hydrogenation catalyst (15% nickel), supported, for example, on kieselguhr, for about 1.5 hours, under 400 pounds pressure. Hydrogenation may be effected continuously by passing the abietate over a stationary activated hydrogenation catalyst as nickel, at about 125-200° C. preferably under pressure as 300-2000 pounds.

Alternatively the product in accordance with this invention may be produced by effecting the reaction between, for example, furfuryl alcohol and hydrogenated abietic acid, as dihydro or tetrahydro abietic acid. The reaction will be carried out as described above; i. e. with the application of heat and, if desired, in the presence of an acid esterification catalyst; and as will be appreciated the abietic acid may be hydrogenated by effecting the hydrogenation of, for example, commercial abietic acid or rosin, as by agitating refined wood rosin at 125-175° C. with 2% of a nickel hydrogenation catalyst under 500-3000 pounds hydrogen pressure.

Again alternatively the product in accordance with this invention may be produced by effecting the hydrogenation of the ester, as for example, furfuryl abietate, as indicated above; i. e. by heating with hydrogen under pressure and if desired in the presence of a hydrogenation catalyst. By such procedure, for example, both the alcohol and the abietyl radical will be hydrogenated and the product will be, for example, tetrahydrofurfuryl dihydro or tetrahydro abietate, or a mixture of the two.

The tetrahydrofurfuryl abietate or di-hydrofurfuryl abietate may, if desired, be reacted with maleic anhydride, or equivalently, maleic acid, instead of hydrogen. Thus, by heating one mole of tetrahydrofurfuryl abietate, or one mole of dihydrofurfuryl abietate, with one mole of maleic anhydride at about 125-175° C., a combination occurs between the said abietate and the maleic anhydride, to form a resinous, acidic reaction product. This resinous acid reaction product may be esterified with an alcohol, e. g. a monohydric alcohol such as methyl, ethyl, propyl, butyl, bornyl, tetrahydrofurfuryl, benzyl, cyclohexanol, abietyl, hydroabietyl, stearyl, etc., alcohols, or either partially or completely esterified with a polyhydric alcohol, such as ethylene glycol, glycerol, pentaerythrite, etc., or mixtures of the foregoing alcohols, yielding products adapted for use in protective coatings and plastics. The esterified, or partially esterified product may be modified by the addition of rosin, hydrogenated rosin, linseed oil or China-wood oil, the free acids of these oils, acids such as stearic abietic, furoic, succinic, adipic, etc.

As examples of the esterification of the tetrahydrofurfuryl abietate/maleic acid condensation product, (1) 400 grams of N wood rosin were esterified by heating with 270 grams of tetrahydrofurfuryl alcohol. The esterification was conducted at a temperature of 180-215° C. during 43 hours. Excess alcohol was then distilled off under reduced pressure, whereby 440 grams of a viscous liquid, acid number 57, were obtained. This product is tetrahydrofurfuryl abietate; (2) 400 grams of the above tetrahydrofurfuryl abietate were condensed with 102 grams of maleic anhydride by heating the reactants for five hours at a temperature of 165-200° C. The resulting condensate, 480 grams, rated E in color; (3a) 200 grams of the above condensate from step 2 were heated with 296 grams of butanol for ten hours at a temperature of 120-130° C. Excess butanol was then distilled off under reduced pressure, leaving 220 grams of a soft resin. This product represents the butyl ester of the above condensate; (3b) 200 grams of the condensate from step 2 were heated with 102 grams of ethylene glycol for a period of eight hours at a temperature from 200-212° C. Excess glycol was then distilled off under reduced pressure, whereby 240 grams of an E+ grade of glycol ester were obtained.

Steps 1, 2, 3a and 3b above were conducted under a blanket of carbon dioxide to prevent undue oxidation.

Again the product in accordance with this invention may be produced by reacting an ester of the alcohol which has been hydrogenated and a hydrogenated salt of abietic acid, as for example, hydrogenated furfuryl chloride and hydrogenated sodium abietate, or either the ester or the salt may be hydrogenated. Tetrahydrofurfuryl abietate will show a refractive index of about 1.52, a specific gravity around 1.04 and thiocyanate value of 55-60. After hydrogenation its refractive index and specific gravity will be decreased while its thiocyanate value will vary from 0 to 25 depending upon the completeness of the saturation with hydrogen.

As will now be apparent, the product in accordance with this invention will be an ester formed by reacting a monohydric heterocyclic alcohol and resin acid, the saturation of either the alcohol or the abietyl radical or both radicals being reduced by hydrogenation. The product is broadly referred to in the claims appended hereto as a hydrogenated reaction product or ester. Further, as will now be apparent the method in accordance with this invention will involve hydrogenation of either the reaction product or ester or of either or both of the reagents; i. e. the alcohol or equivalent ester or the abietic acid or equivalent salt.

The product in accordance with this invention will be found advantageous for use variously in the commercial arts and more especially as an ingredient in coating compositions as, for example, lacquers, films, various plastic compositions.

Tetrahydrofurfuryl hydro-abietate, tetrahydrofurfuryl abietate, tetrahydrofurfuryl hydro-abietate-maleate, or tetrahydrofurfuryl abietate-maleate may be employed in lacquer compositions, for example, and by using 8 parts of any of the above resinous substances, 4 parts of Dammar, 10 parts of nitrocellulose and 78 parts of solvents and diluents.

It will be understood that by the term "hydro-abietate" it is intended to cover both di- and tetrahydro abietates or a mixture thereof.

This application forms a continuation-in-part of an application Serial No. 619,121 filed by Humphrey and Borglin June 24, 1932, for Resin acid ester and method of producing the same (now United States Patent No. 2,089,375).

What we claim and desire to protect by Letters Patent is:

1. The reaction product of dihydrofurfuryl abietate and maleic anhydride.
2. The reaction product of tetrahydrofurfuryl abietate and maleic anhydride.
3. The method which includes reacting a monohydric, heterocyclic alcohol and abietic acid, the unsaturation of said alcohol being reduced by hydrogen, and reacting the resulting product with maleic anhydride.
4. The method which includes reacting a hydrogenated furfuryl alcohol and abietic acid, and reacting the resulting product with maleic anhydride.
5. The method which includes reacting a monohydric, heterocyclic alcohol and an unsaturated rosin acid, the unsaturation of said alcohol being reduced by hydrogen, and reacting the resulting product with maleic anhydride.
6. The reaction product of an ester of a monohydric, heterocyclic alcohol and abietic acid with maleic anhydride, the unsaturation of said alcohol being reduced by hydrogen.
7. The reaction product of an ester of a hydrofurfuryl alcohol and abietic acid with maleic anhydride.
8. The reaction product of an ester of a monohydric, heterocyclic alcohol and an unsaturated rosin acid with maleic anhydride, the unsaturation of said alcohol being reduced by hydrogen.

IRVIN W. HUMPHREY.
JOSEPH N. BORGLIN.